United States Patent
Kim et al.

(10) Patent No.: US 8,527,825 B2
(45) Date of Patent: Sep. 3, 2013

(54) DEBUGGER BASED MEMORY DUMP USING BUILT IN SELF TEST

(75) Inventors: Hong S. Kim, Austin, TX (US); Paul F. Policke, Austin, TX (US); Paul Douglas Bassett, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 12/886,629

(22) Filed: Sep. 21, 2010

(65) Prior Publication Data
US 2012/0072791 A1    Mar. 22, 2012

(51) Int. Cl.
*G01R 31/28* (2006.01)
(52) U.S. Cl.
USPC ............ 714/733; 714/734; 714/726; 714/727
(58) Field of Classification Search
USPC .................................. 714/726–727, 733–734
See application file for complete search history.

(56) References Cited

U.S. PATENT DOCUMENTS

| | | | |
|---|---|---|---|
| 5,963,565 A * | 10/1999 | Rezvani et al. | 714/724 |
| 6,321,320 B1 | 11/2001 | Fleischman et al. | |
| 7,550,995 B1 | 6/2009 | Guilloteau et al. | |
| 7,694,194 B2 | 4/2010 | Hayashi et al. | |
| 2002/0065646 A1 | 5/2002 | Waldie et al. | |
| 2005/0246602 A1 * | 11/2005 | Bahl et al. | 714/733 |
| 2007/0288816 A1 | 12/2007 | Nakanishi | |
| 2009/0199163 A1 * | 8/2009 | Soroker et al. | 717/128 |
| 2010/0107023 A1 | 4/2010 | Guettaf et al. | |
| 2010/0257408 A1 * | 10/2010 | Bartels et al. | 714/37 |

OTHER PUBLICATIONS

International Search Report and Written Opinion—PCT/US2011/052632—ISA/EPO—Nov. 17, 2011.
Miyazaki M., et al., "A memory grouping method for sharing memory bist logic", Design Automation, 2006. Asia and South Pacific Conference on Jan. 24, 2006, Piscataway, NJ, USA,IEEE, Jan. 24, 2006, pp. 671-676, XP010901150, DOI: 10.1109/ASPDAC. 2006.1594763 ISBN: 978-0-7803-9451-3 abstract figures 1-3 p. 671, right-hand column, paragraph 3-p. 672, left-hand column, paragraph 1.
Posse K., et al., "IEEE P1687: Toward Standardized Access of Embedded Instrumentation", Test Conference, 2006. ITC '06. IEEE International, IEEE, PI, Oct. 1, 2006, pp. 1-8, XP031014808, ISBN: 978-1-4244-0291-5 abstract figure 1 p. 1, left-hand column, paragraph 2-p. 4, right-hand column, paragraph 2.

(Continued)

*Primary Examiner* — Guy Lamarre
(74) *Attorney, Agent, or Firm* — Nicholas J. Pauley; Sam Talpalatsky; Joseph Agusta

(57) ABSTRACT

A method and apparatus for performing a memory dump. The method includes providing a memory location from a debugger to a memory array through a BIST wrapper, and receiving data by the debugger read from the memory location in the memory array. The method can include sending a dump enable signal from the debugger, and the BIST wrapper selectively providing the memory location to the memory array in response to the dump enable signal. The method can include sending the dump enable signal to a multiplexer coupled to a register in the BIST wrapper, the dump enable signal causing the multiplexer to load the register with the memory location. The method can include asynchronously sending a write disable signal to the memory array before reading the data from the memory location. The received data can be selected from a larger set of data read from the memory location.

18 Claims, 4 Drawing Sheets

(56) References Cited

OTHER PUBLICATIONS

Wang D., et al., "The design-for-testability features of a general purpose microprocessor", International Test Conference 2007, Oct. 23-25, 2007, Santa Clara, CA, USA, IEEE, Piscataway, NJ, USA, Oct. 1, 2007, pp. 1-9, XP031206967, ISBN: 978-1-4244-1127-6 abstract figures 3,8,11 p. 2, right-hand column, paragraph 2-p. 3, left-hand column, paragraph 4 p. 4, right-hand column, paragraph 3-p. 5, right-hand column, paragraph 3.

* cited by examiner

DEBUGGER BASED MEMORY DUMP USING BUILT IN SELF TEST

FIELD OF DISCLOSURE

The present disclosure relates generally to integrated circuit diagnostics, and more particularly to a memory dump system using a debugger interface of the integrated circuit.

BACKGROUND

Diagnostic memory dumps can be performed to observe the various memory contents to aid in understanding the behavior of a chip at certain target cycles. However, current methods to observe the entire memory contents can be difficult and time consuming, and can be costly in terms of the silicon area needed for the diagnostic circuit elements.

Some integrated circuits or chips include a memory built-in self test (BIST) which is a mechanism that permits the chip to test its memory. Some integrated circuits also include a debugger interface, for example a Joint Test Action Group (JTAG) interface. Debugging systems can communicate with chips through the debugger interface to perform operations like single stepping and break pointing to debug various components on the chip.

It would be desirable to leverage and reuse the BIST and debugger interface for diagnostic memory dumps.

SUMMARY

A method for performing a memory dump is disclosed that includes providing a memory location from a debugger to a memory array through a BIST wrapper, and receiving data by the debugger read from the memory location in the memory array. The method can also include sending a dump enable signal from the debugger to the BIST wrapper, and the BIST wrapper selectively providing the memory location to the memory array in response to the dump enable signal. The BIST wrapper can communicate with the data array using a register in the BIST wrapper, and the method can also include sending the dump enable signal to a multiplexer coupled to the register in the BIST wrapper, the dump enable signal causing the multiplexer to load the register with the memory location. The method can also include asynchronously sending a write disable signal to the memory array before reading the data from the memory location in the memory array, the write disable signal disabling writes to the memory array. The BIST wrapper can be part of a memory BIST, and the debugger can be a JTAG debugger. Data read from the memory location in the memory array can be sent to a readout register accessible by the debugger. The readout register can also be accessible by the BIST wrapper. The received data can be selected from a larger set of data read from the memory location by providing a bit selection indicator from the debugger, the bit selection indicator indicating the bits of the larger set of data read from the memory location to be passed to the debugger.

An apparatus is disclosed that includes a BIST wrapper and a debugger interface configured to provide a memory location through the BIST wrapper to a memory array and receive data read from the memory array at the memory location. The debugger interface can provide a dump enable signal to the BIST wrapper; and the BIST wrapper can selectively provide the memory location to the memory array in response to the dump enable signal. The BIST wrapper further can include a multiplexer and a memory interface register. The multiplexer can be coupled to an output of the memory interface register, and the dump enable signal can be sent to the multiplexer so that the multiplexer provides the memory location to the memory array through the memory interface register. The debugger interface can asynchronously provide a write disable signal to the memory array to disable writes to the memory array.

The apparatus can also include a readout register that is accessible by the debugger interface and that receives the data read from the memory location in the memory array. The readout register can be accessible by both the debugger interface and the BIST wrapper. The received data can be selected from a larger set of data read from the memory location. A bit selection indicator provided by the debugger interface can indicate the bits of the larger set of data read from the memory location to be passed to the debugger interface. The apparatus can be incorporated into a device selected from a group consisting of a music player, a video player, an entertainment unit, a navigation device, a communications device, a personal digital assistant (PDA), a fixed location data unit, and a computer.

A memory access controller is disclosed that includes a memory self test means for testing a memory device, and a debugger means for directing the memory self test means. The debugger means is configured to provide a memory location through the memory self test means to a memory array of the memory device, and the debugger means is also configured to receive data read from the memory array at the memory location.

For a more complete understanding of the present disclosure, reference is now made to the following detailed description and the accompanying drawings.

DETAILED DESCRIPTION

The memory built-in-self-test (BIST) can be leveraged and reused through a debug or test interface, such as a Joint Test Action Group (JTAG) interface, to provide a method for performing diagnostics. By providing some logic between the debugger interface and the memory BIST, users can indirectly control and read from memory using debugger commands. This allows users to select particular memory locations and read partial or entire memory contents at those locations for diagnostic purposes.

Figure 1:
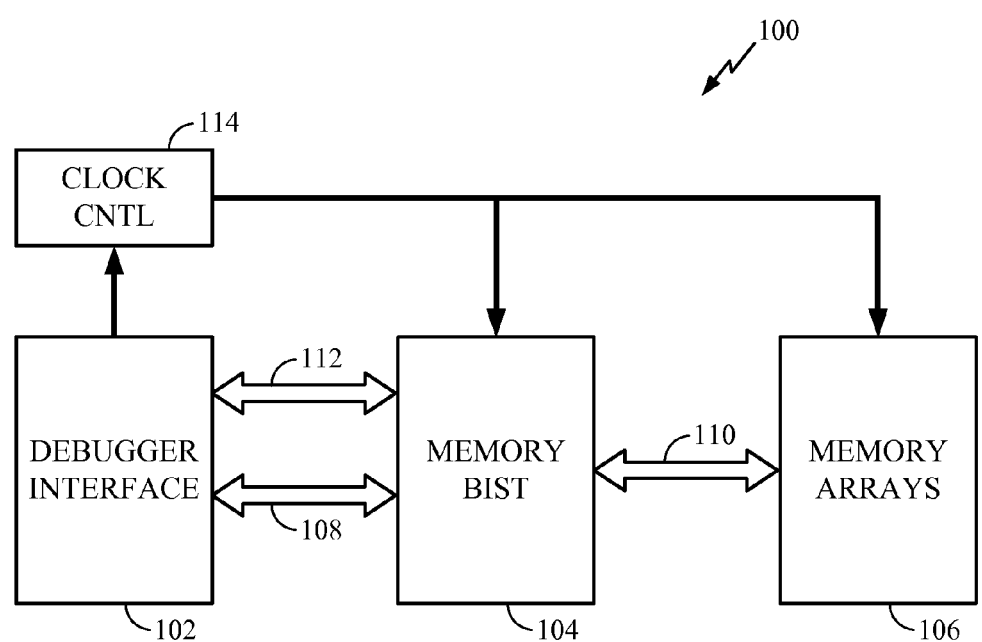
FIG. 1 is a block diagram of an exemplary embodiment of a debugger based memory dump system.

FIG. 1 shows an exemplary top-level diagram of a system 100 comprising a debugger interface 102, a memory BIST 104 and memory data arrays 106. The debugger interface 102 can be, for example, a Joint Test Action Group (JTAG) interface or another type of debugger interface. The debugger interface 102 communicates with the BIST 104 through a BIST interface 108 and the BIST 104 communicates with the data arrays 106 through a memory interface 110. A memory control interface 112 can be used to indirectly control and read from the memory arrays 106 through the BIST 104 using debugger commands at the debugger interface 102. A clock control 114 can also be controlled by the debugger interface 102 to send a clock stop signal to the BIST 104 and to the memory arrays 106 to disable any writes to memory to prevent memory corruption during the diagnostic phase.

Figure 2:
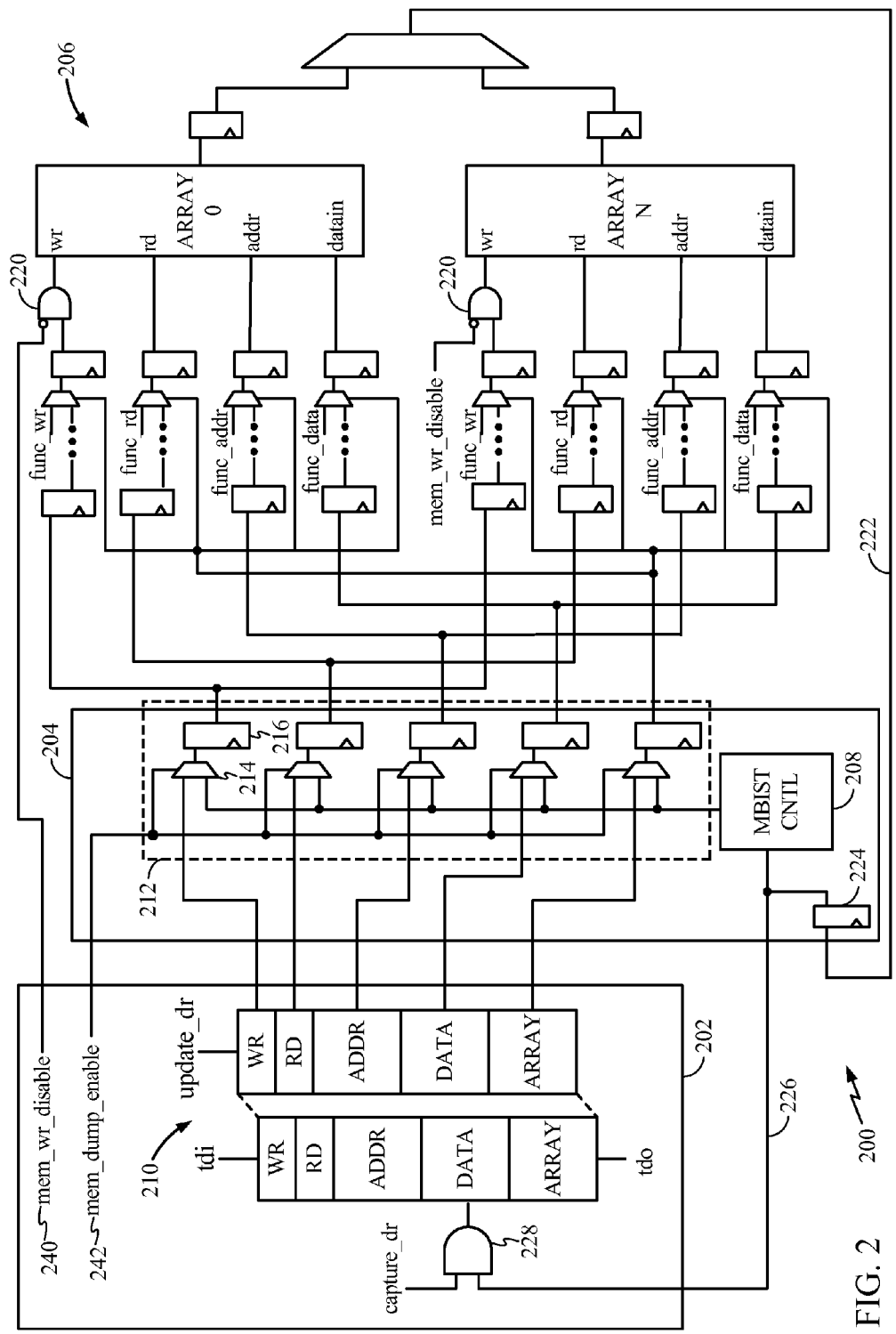
FIG. 2 is a circuit diagram of an exemplary embodiment of a debugger based memory dump system.

FIG. 2 shows a more detailed diagram of an exemplary system 200 comprising a debugger interface 202, a BIST wrapper 204 and a plurality of data arrays 206. The debugger interface 202 includes a debugger data register 210 that includes write, read, address, data and array selection fields. The array field identifies a selected data array of the plurality of data arrays 206 and the address bits identify a memory location in the selected data array 206. The read and write fields identify the type of memory operation desired at the selected memory location. The data field holds the data to be written to or that is read from the selected memory location. Two instances of the debugger data register 210 are shown in FIG. 2, one during the update phase when the register fields are being communicated to the BIST wrapper 204 and the data arrays 206, and one during the capture phase when the output from the data arrays 206 is being sent to the debugger data register 210. These two phases of the debugger data register 210 are identified in the description below.

The debugger interface 202 controls a memory write disable signal 240 and a memory dump enable signal 242. The memory write disable signal 240 is used to disable writes to the plurality of data arrays 206 during the memory dump. The memory dump enable signal 242 is used to enable a memory dump using the debugger interface 202. The use of these signals will be described in more detail below.

The BIST wrapper 204 includes a BIST controller 208 and a diagnostic control portion 212. The diagnostic control portion 212 includes multiplexers 214 and memory interface registers 216. The multiplexers 214 control whether the debugger data register 210 of the debugger interface 202 or the BIST controller 208 is selected to load the memory interface registers 216 that communicate with the data arrays 206.

A memory dump can be activated by the debugger interface 202 using a clock stop instruction or command. When the memory dump is activated by the debugger at a clock stop instruction, the clock is stopped when the program reaches the clock stop location; the memory write disable signal 240 is sent asynchronously to the write control of each of the plurality of memory arrays 206; and the dump enable signal 242 is activated. The write disable is illustrated by an inverted input to an AND gate 220 at the write control input of each of the data arrays 206. Thus, when the write disable signal 240 is activated, the inverted signal causes the AND gates 220 at each of the write control inputs to block incoming signals and prevent any writes to the data arrays 206. The write disable signal 240 is sent asynchronously because the clock is stopped during the diagnostic phase. The write disable signal 240 can be sent directly to the write control inputs of the memory arrays 206 since the debugger normally runs at a lower frequency than the BIST. The asynchronous write disable prevents the memory from being corrupted during the diagnostic phase and enables the system to be restarted with the memory undisturbed.

The dump enable signal 242 is sent to the select input of each of the multiplexers 214 of the diagnostic control portion 212 of the BIST wrapper 204. The dump enable signal 242 causes the multiplexers 214 to load the fields from the debugger data register 210 (update phase) into the memory interface registers 216. The debugger data register 210 (update phase) identifies the location in the data arrays 206 to be captured. The contents of the memory interface registers 216 are sent to the data arrays 206. The contents of the memory location designated by the debugger data register 210 through the diagnostic control portion 212 of the BIST wrapper 204 is read from the data arrays 206 and is output over comparator lines 222 to the BIST controller 208 and/or to the debugger interface 202 where they can be checked. FIG. 2 shows the output of the data from the data arrays 206 being coupled to a BIST readout register 224 that is accessible by the BIST controller 208 and is also accessible by the debugger interface 202 through BIST output lines 226. When a capture signal to a capture AND gate 228 for the debugger interface 202 indicates that the debugger is ready to receive the contents of the selected memory location, the signal on BIST output lines 226 is sent to the data field of the debugger data register 210 (capture phase).

While the system is in the diagnostic state, multiple memory locations in the data arrays 206 can be checked using the debugger data register 210 through the BIST multiplexers 214 to readout data on the comparator lines 222 to the BIST controller 208 and over the output lines 226 to the debugger interface 202. During the diagnostic phase, the memory write disable signal to the AND gates 220 at each of the write control inputs of the data arrays 206 prevents the memory arrays 206 from being corrupted.

The dump enable signal 242 can be deactivated to indicate that the diagnostic phase is complete. When the dump enable signal 242 is deactivated, the memory write disable signal 240 is deactivated and the clock is restarted. When the memory write disable signal 240 is deactivated, the AND gates 220 enable writing to the data arrays 206 and the system 200 can resume operation. When the dump enable signal 242 is deactivated, the select signal to the multiplexers 214 causes the memory interface registers 216 to be loaded from the BIST controller 208.

Figure 3:
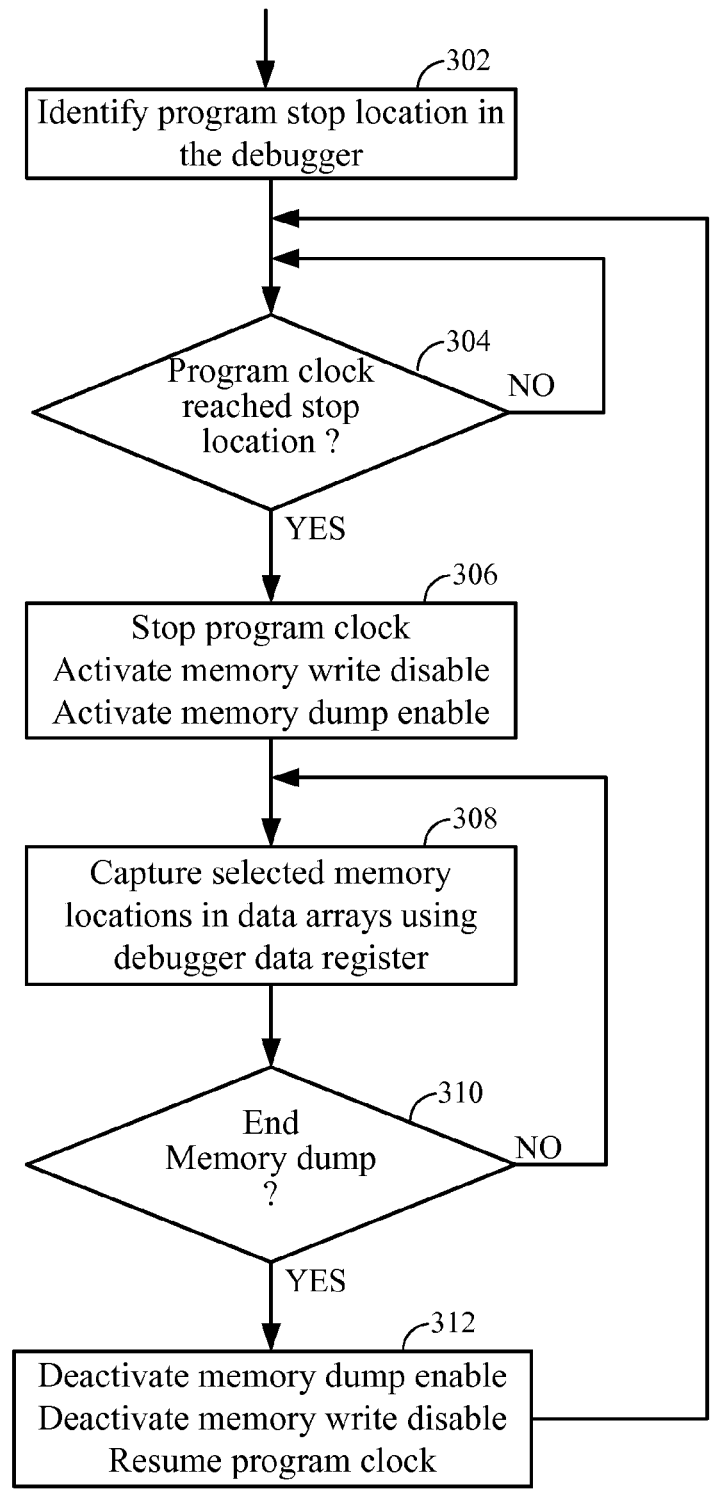
FIG. 3 is an exemplary flow diagram of a memory dump system.

FIG. 3 shows an exemplary method for a memory dump using a debugger interface. At block 302, a program clock stop location is identified in the debugger. A plurality of stop locations can be identified and each is serviced when the clock reaches the specified stop location.

At block 304, the debugger checks whether the program clock has reached a stop location. While the program clock is not at a stop location, the program continues to run. When the program clock reaches a stop location, control is transferred to block 306.

At block 306, the program clock is stopped at the stop location, the memory write disable signal 240 is activated, and the memory dump enable signal 242 is activated. The memory write disable signal 240 is sent asynchronously to the data arrays 206 to prevent writes to the data arrays 206 during the memory dump. The dump enable signal 242 causes the multiplexers 214 of the diagnostic control portion 212 of the BIST wrapper 204 to select the debugger data register 210 for loading the memory interface registers 216.

At block 308, selected memory locations in the data arrays 206 are captured using the debugger data register 210. The debugger data register 210 is loaded with a read command and a memory location in the data arrays 206. The memory location is passed from the debugger data register 210 to the memory interface registers 216 in the BIST wrapper 204 through the multiplexers 214. The contents of the memory location specified by the debugger data register 210 is read from the memory arrays 206 and sent to the debugger interface 202. A readout register, such as the BIST readout register 224, can be used that is accessible by both the BIST controller 208 and the debugger interface 202. The contents of the selected memory location can be captured in the data field of the debugger data register 210.

At block 310, if the memory dump is not complete, additional data locations in the data arrays 206 can be checked using the procedure of block 308. At block 310, when the memory dump is complete, control is transferred to block 312.

At block 312, the memory dump enable signal is deactivated, the write disable signal is deactivated and the program clock resumes. Deactivating the dump enable signal 242 causes the multiplexers 214 of the diagnostic control portion 212 of the BIST wrapper 204 to load the memory interface registers 216 from the BIST controller 208. Deactivating the memory write disable signal 240 enables data to be written to the data arrays 206. From block 312, control can be returned to block 304 to wait for the program clock to reach another stop location.

Bit/byte selection elements can be added if the width of the various data storage elements and buses shown in FIG. 2 are not the same. For example, if the data field in the debugger data register 210 is not as wide as the BIST readout register 224, a select field can be added to the debugger data register 210 to indicate which bits of the data in the BIST readout register 224 are to be passed over the BIST output lines 226 to the debugger interface 202; and a multiplexer can be added on the output lines 226 that uses the contents of the select field of the debugger data register 210 to select which bits/bytes are passed to the capture AND gate 228. Also for example, if the memory locations in the data arrays 206 are wider than the BIST readout register 224, a select field can be added to indicate which bits of the data readout from the selected location in the data arrays 206 are to be passed over the comparator lines 222 to the BIST readout register 224; and a multiplexer can be added on the comparator lines 222 that uses the contents of the select field to select which bits/bytes are passed to the BIST readout register 224.

Figure 4:
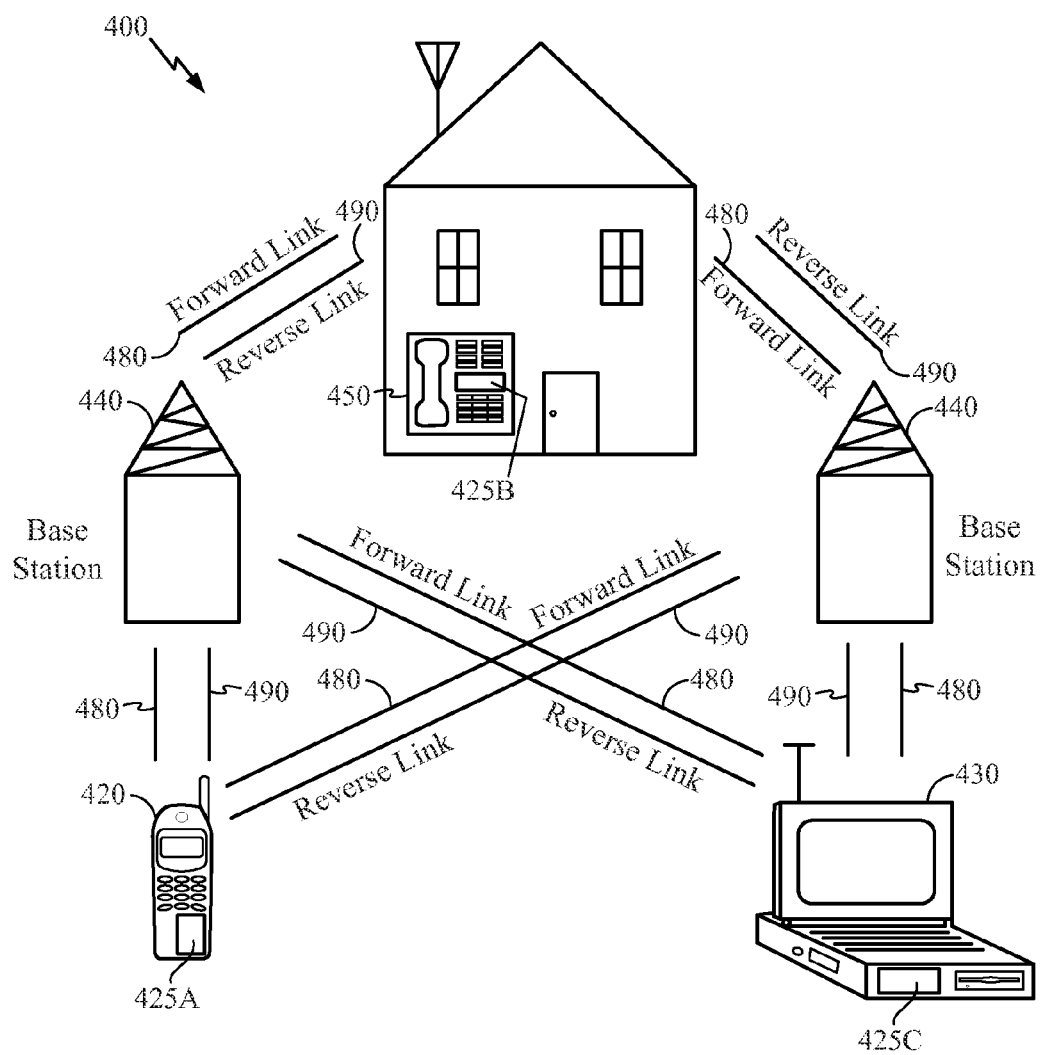
FIG. 4 is a block diagram showing an exemplary wireless communication system in which an embodiment of a debugger based memory dump system may be advantageously employed.

FIG. 4 shows an exemplary wireless communication system 400 in which an embodiment of a debugger based memory dump system may be advantageously employed. For purposes of illustration, FIG. 4 shows three remote units 420, 430, and 450 and two base stations 440. It should be recognized that typical wireless communication systems may have many more remote units and base stations. Any of the remote units 420, 430, and 450 may include the debugger based memory dump system as disclosed herein. FIG. 4 shows forward link signals 480 from the base stations 440 and the remote units 420, 430, and 450 and reverse link signals 490 from the remote units 420, 430, and 450 to base stations 440.

In FIG. 4, remote unit 420 is shown as a mobile telephone, remote unit 430 is shown as a portable computer, and remote unit 450 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 4 illustrates certain exemplary remote units that may include the debugger based memory dump system as disclosed herein, the architectures and methods as disclosed herein are not limited to these exemplary illustrated units. Embodiments may be suitably employed in any electronic device in which a debugger based memory dump system is desired.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing a memory dump comprising:
provided a program clock has reached a stop location in a debugger program, stopping the program clock, activating a memory write disable signal, and activating a memory dump enable signal;
providing a memory address from a debugger interface to a memory array through a BIST wrapper; and
receiving data by the debugger interface read from the memory array specified by the memory address;
selecting the received data from a larger set of data read from the memory array specified by the memory address; and
providing a bit selection indicator from the debugger, the bit selection indicator indicating the bits of the larger set of data read from the memory location to be passed to the debugger.

2. The method of claim 1, wherein the BIST wrapper communicates with the data array using a register in the BIST wrapper, the method further comprising:
sending the dump enable signal to a multiplexer coupled to the register in the BIST wrapper, the dump enable signal causing the multiplexer to load the register with the memory address.

3. The method of claim 1, further comprising asynchronously sending the memory write disable signal to the memory array before reading the data from the memory array specified by the memory address, the write disable signal disabling writes to the memory array.

4. The method of claim 1, wherein the BIST wrapper is included in a memory BIST.

5. The method of claim 1, wherein the debugger interface is a JTAG debugger interface.

6. The method of claim 1, further comprising asynchronously disabling writes to the memory array before reading the data from the memory array specified by the memory address.

7. The method of claim 1, wherein the data is received by the debugger interface from the BIST wrapper.

8. The method of claim 1, further comprising:
sending data read from the memory array specified by the memory address to a readout register accessible by the debugger interface.

9. The method of claim 8, wherein the readout register is accessible by both the debugger interface and the BIST wrapper.

10. An apparatus comprising:
a memory array to receive a write disable signal to disable writes to the memory array in response to a program clock reaching a stop location in a debugger program;
a BIST wrapper;
a debugger interface configured to provide a memory address through the BIST wrapper to the memory array and receive data read from the memory array specified by the memory address;
wherein the debugger interface provides a dump enable signal to the BIST wrapper in response to the program clock reaching the stop location;
wherein the received data is selected from a larger set of data read from the memory array; and
the apparatus further comprising a bit selection indicator provided by the debugger interface, the bit selection indicator indicating the bits of the larger set of data read from the memory array to be passed to the debugger interface.

11. The apparatus of claim 10, wherein the BIST wrapper selectively provides the memory address to the memory array in response to the dump enable signal.

12. The apparatus of claim 11, wherein the BIST wrapper further comprises a multiplexer and a memory interface register, the multiplexer being coupled to an output of the memory interface register, wherein the dump enable signal is sent to the multiplexer, and the multiplexer provides the memory address to the memory array through the memory interface register.

13. The apparatus of claim 11, wherein the debugger interface asynchronously provides the write disable signal to the memory array to disable writes to the memory array.

14. The apparatus of claim 10, wherein the debugger interface asynchronously provides the write disable signal to the memory array to disable writes to the memory array.

15. The apparatus of claim 10, wherein the data is received by the debugger interface from the BIST wrapper.

16. The apparatus of claim 10, further comprising a readout register accessible by the debugger interface, the readout register receiving the data read from the memory array specified by the memory address.

17. The apparatus of claim 16, wherein the readout register is accessible by both the debugger interface and the BIST wrapper.

18. The apparatus of claim 10 incorporated into a device selected from a group consisting of a music player, a video player, an entertainment unit, a navigation device, a communications device, a personal digital assistant (PDA), a fixed location data unit, and a computer.

* * * * *